United States Patent
Gosselet

(10) Patent No.: US 6,397,435 B1
(45) Date of Patent: Jun. 4, 2002

(54) HANDLE ASSEMBLY WITH INTEGRATED HOOK

(75) Inventor: Philippe Gosselet, Chaucenne (FR)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/549,465

(22) Filed: Apr. 14, 2000

Related U.S. Application Data

(60) Provisional application No. 60/130,274, filed on Apr. 22, 1999.

(51) Int. Cl.⁷ .................................................. E05B 1/00
(52) U.S. Cl. .............................. 16/438; 224/313; 16/445
(58) Field of Search ........................ 16/438, 444, 445; 296/214, 97.9; 224/268, 313

(56) References Cited

U.S. PATENT DOCUMENTS

| | | | | |
|---|---|---|---|---|
| 4,720,028 A | * | 1/1988 | Takemura et al. ........ | 224/42.45 |
| 4,981,323 A | * | 1/1991 | Dowd et al. ................ | 296/214 |
| 5,366,127 A | * | 11/1994 | Heinz ......................... | 224/313 |
| 5,403,064 A | * | 4/1995 | Mahler et al. .............. | 296/214 |
| 5,419,067 A | | 5/1995 | Drummond et al. | |
| 5,519,917 A | * | 5/1996 | Cordonnier ............... | 16/110 R |
| 5,625,921 A | * | 5/1997 | Smith ......................... | 16/112 |
| 5,820,205 A | * | 10/1998 | Ammons ..................... | 296/214 |
| 5,855,408 A | * | 1/1999 | Rickabus ..................... | 296/214 |
| 6,048,125 A | * | 4/2000 | Droche et al. ................ | 403/12 |
| 6,076,233 A | * | 6/2000 | Sasaki et al. ................. | 16/444 |
| 6,095,469 A | * | 8/2000 | Von Alman ................. | 248/304 |

FOREIGN PATENT DOCUMENTS

| | | |
|---|---|---|
| DE | 35 13293 A1 | 10/1986 |
| DE | 36 16441 A1 | 11/1987 |
| DE | 38 28701 A1 | 3/1990 |
| DE | 196 11 309 A | 2/1998 |
| FR | 2451840 | 10/1980 |

OTHER PUBLICATIONS

English Abstract of DE 3828701.
English Abstract of DE 19611309.
English Abstract of DE 3513293.
English Abstract of DE 3616441.
English Translation of FR 2 451 840.

* cited by examiner

*Primary Examiner*—Lynne H. Browne
*Assistant Examiner*—John B. Walsh
(74) *Attorney, Agent, or Firm*—Brooks & Kushman P.C.

(57) ABSTRACT

A handle assembly for use with a motor vehicle includes a handle adapted to be connected to the vehicle, and a support hook pivotally connected to the handle. The support hook is pivotable between a stowed position and a use position for supporting articles in the vehicle.

50 Claims, 3 Drawing Sheets

HANDLE ASSEMBLY WITH INTEGRATED HOOK

CROSS-REFERENCE TO RELATED APPLICATIONS

This application claims the benefit of U.S. provisional application Serial No. 60/130,274 filed Apr. 22, 1999.

TECHNICAL FIELD

The invention relates to a handle assembly with an integrated support hook, such as a coat-hook, for use with a motor vehicle.

BACKGROUND ART

Grab handles and coat-hooks are frequently provided in the interior of motor vehicles. Such handles and coat-hooks are, however, provided as separate components. Consequently, the cost to manufacture and install such components is significant.

DISCLOSURE OF INVENTION

The present invention is a handle assembly for use with a motor vehicle. The handle assembly includes a handle adapted to be connected to the vehicle, and a support hook pivotally connected to the handle. The support hook is pivotable between a stowed position and a use position for supporting articles in the vehicle.

The handle assembly may further comprise a spring connected between the handle and the support hook for urging the support hook toward the use position. In addition, the handle assembly may include a latch mechanism that is moveably associated with the handle, and engageable with a slot in the support hook to secure the support hook in the stowed position.

In a preferred embodiment, the handle assembly is provided with a mounting bracket that is adapted to be connected to the vehicle. Furthermore, the handle and the support hook are preferably each pivotally connected to the mounting bracket. Another spring may be connected between the handle and the mounting bracket for urging the handle upwardly toward a rest position.

Preferably, a dampening mechanism is connected between the support hook and the mounting bracket for dampening pivotal movement of the support hook. Advantageously, the dampening mechanism may also dampen pivotal movement of the handle when the support hook is in the stowed position.

While the dampening mechanism may comprise any suitable element or elements, the dampening mechanism preferably includes an inner cylinder connected to the mounting bracket, and an outer cylinder connected to the support hook that frictionally and rotatably engages the inner cylinder.

These and other objects, features and advantages of the invention are readily apparent from the following detailed description of the best modes for carrying out the invention when taken in conjunction with the accompanying drawings.

BEST MODE FOR CARRYING OUT THE INVENTION

Figure 1:
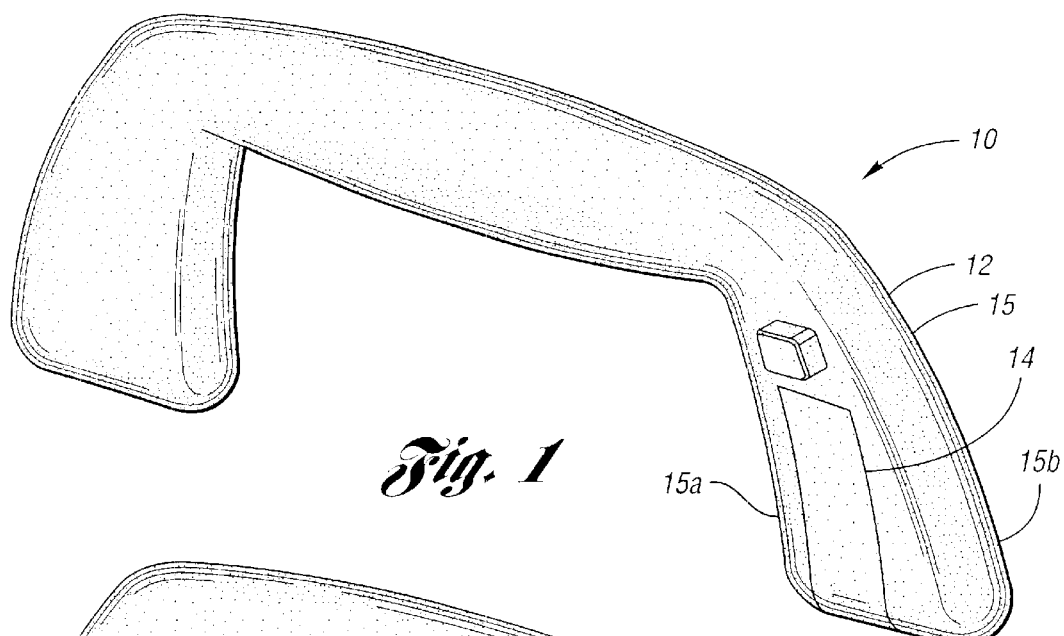
FIG. 1 is a perspective view of a handle assembly according to the invention including a handle and an integrated support hook such as a coat-hook, wherein the coat-hook is shown in a stowed position.
Figure 2:
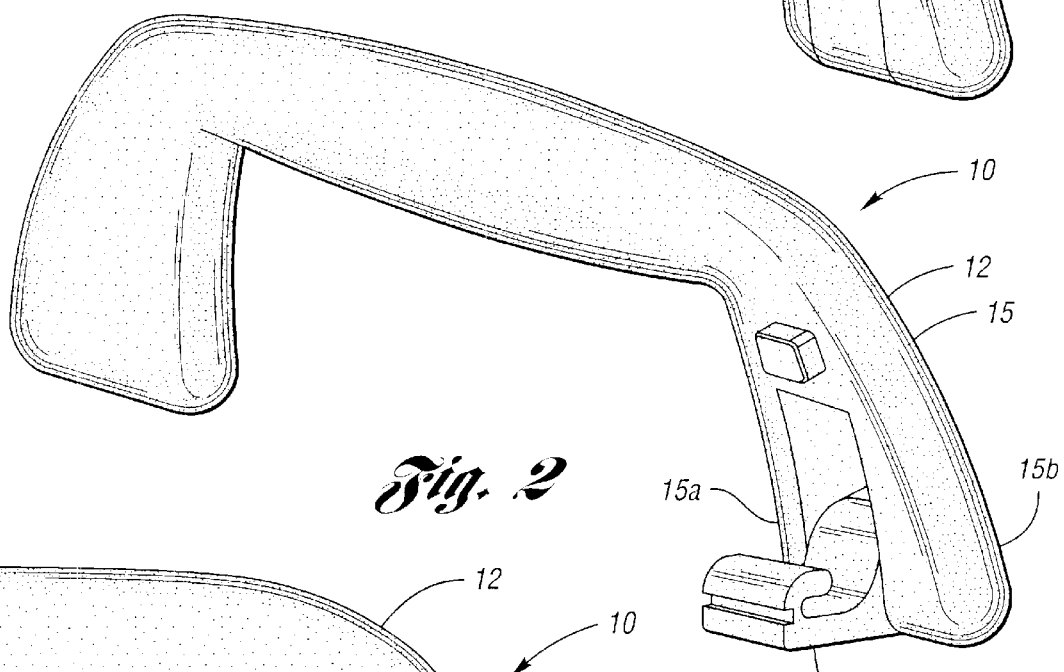
FIG. 2 is a perspective view of the handle assembly showing the coat-hook in a use position.
Figure 3:
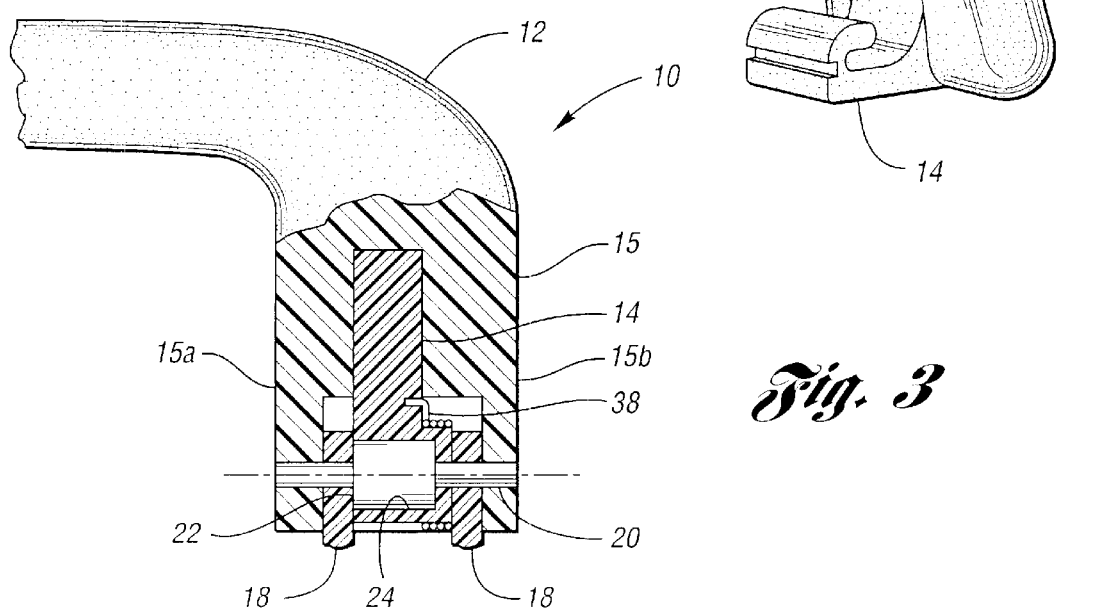
FIG. 3 is a fragmentary front view of the handle assembly partially in section.
Figure 4:
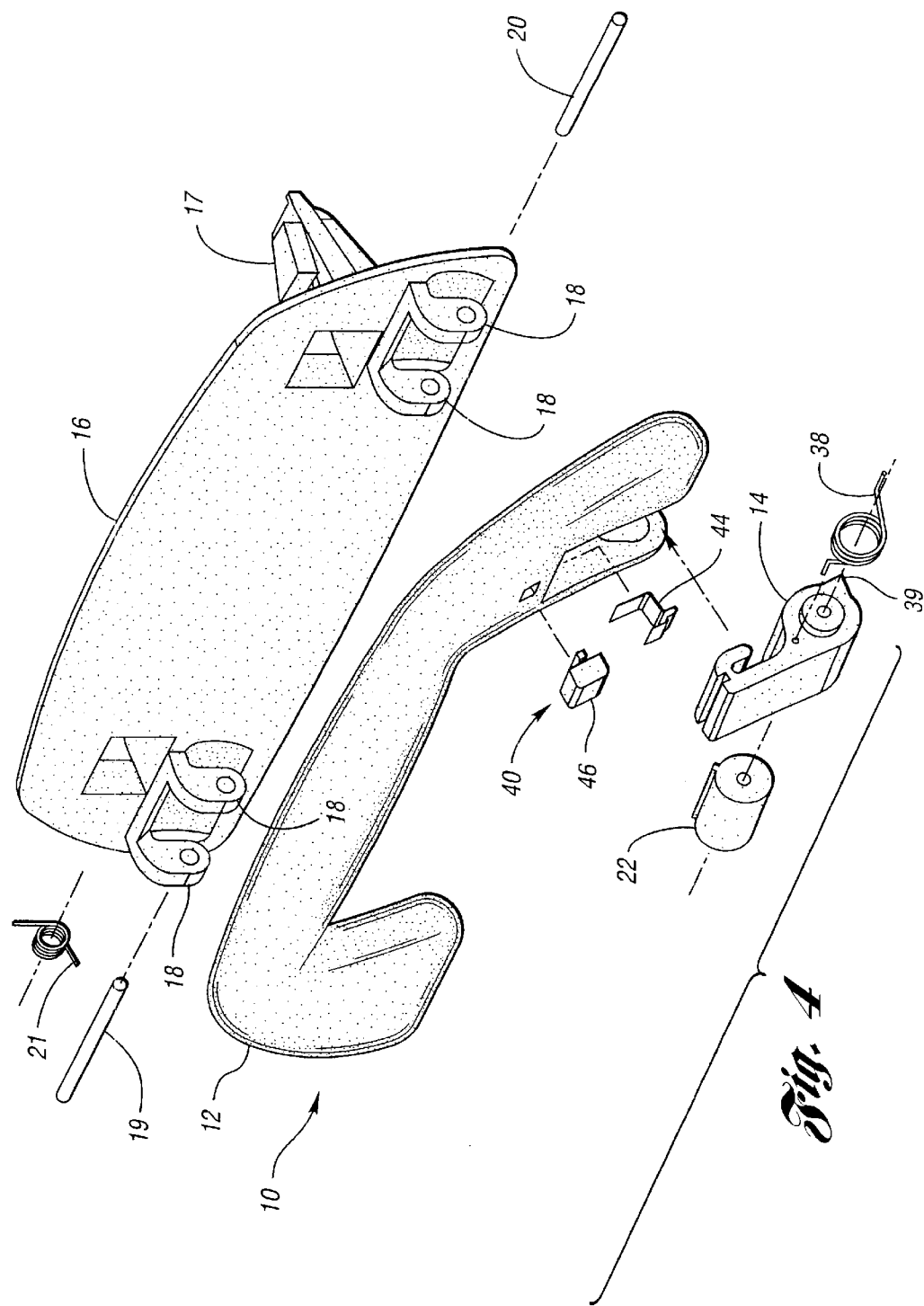
FIG. 4 is an exploded perspective view of the handle assembly.
Figure 5:
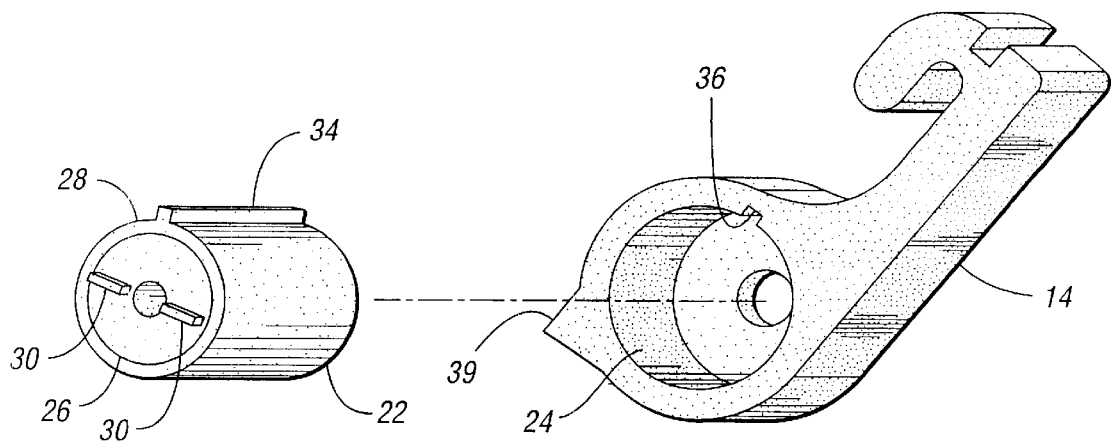
FIG. 5 is an exploded perspective view of the coat-hook and a dampening mechanism.
Figure 5:
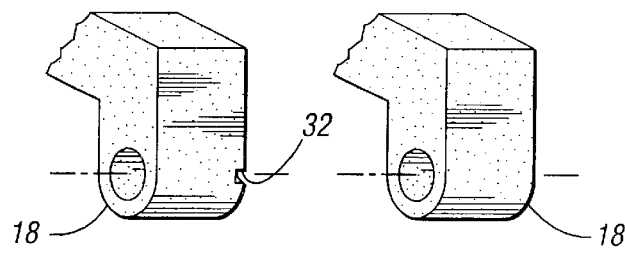

FIGS. 1 through 4 show a handle assembly 10 according to the invention for use with a motor vehicle. The handle assembly 10 includes a handle 12 and a support hook, such as a coat-hook 14, pivotally connected to a leg 15 of the handle 12, wherein the coat-hook 14 is pivotable between a stowed position shown in FIG. 1, and a use position shown in FIG. 2. As shown in FIGS. 1–3, the coat-hook 14 is also disposed between first and second leg portions 15a and 15b, respectively. The handle 12 is preferably pivotally connected to a mounting bracket 16, which is adapted to be mounted to the vehicle in any suitable manner, such as with Z-clips 17 shown in FIG. 4, or with removable fasteners such as bolts or screws (not shown). The mounting bracket 16 has a plurality of hinges 18 for receiving the handle 12, and the handle 12 is preferably connected to the hinges 18 with first and second pivot pins 19 and 20, respectively. The second pivot pin 20 also pivotally connects the coat-hook 14 to the handle 12 and the mounting bracket 16. A first torsional spring 21 is connected between the handle 12 and the mounting bracket 16 for urging the handle 12 upwardly toward a substantially vertical rest position. Alternatively, the handle 12 may be fixedly attached to the motor vehicle such that the handle does not pivot.

As shown in FIGS. 3 through 6, the handle assembly 10 preferably includes a dampening mechanism or damper 22, which is disposed in a bore 24 of the coat-hook 14 and serves to dampen pivotal movement of the coat-hook 14 so as to enable smooth, controlled movement of the coat-hook 14. The damper 22 includes an inner silicone cylinder 26 and an outer cylinder 28 that frictionally and rotatably engages the inner cylinder 26. The inner cylinder 26 has a pair of first ribs 30 disposed on one end, and the ribs 30 engage a first slot 32 in one of the hinges 18. The outer cylinder 28 has a second rib 34 that engages a second slot 36 of the bore 24 such that the outer cylinder 28 moves with the coat-hook 14. Alternatively, the damper 22 may include any suitable element or elements connected between the mounting bracket 16 and the coat-hook 14.

Advantageously, the damper 22 also dampens pivotal movement of the handle 12 when the coat-hook 14 is in the stowed position. This occurs because the coat-hook 14 pivots with the handle 12 when the coat-hook 14 is in the stowed position. Thus, only one dampening mechanism is needed to dampen pivotal movement of both the coat-hook 14 and the handle 12. When the coat-hook 14 is in the use position, however, the coat-hook 14 does not pivot with the handle 12. Consequently, the damper 22 does not dampen pivotal movement of the handle 12 when the coat-hook 14 is in the use position. Alternatively, the handle assembly 10 may be provided without a dampening mechanism.

The handle assembly 10 further includes a second torsional spring 38 connected between the coat-hook 14 and the handle 12 for urging the coat-hook 14 toward the use position. A projection 39 on the coat-hook 14 is engageable with the mounting bracket 16 to limit movement of the coat-hook 14. Advantageously, because the first torsional spring 21 is connected between the handle 12 and the mounting bracket 16, and the second torsional spring 38 is connected between the handle 12 and the coat-hook 14, there is no interaction between opposite forces developed by the torsional springs 21 and 38.

Figure 6:
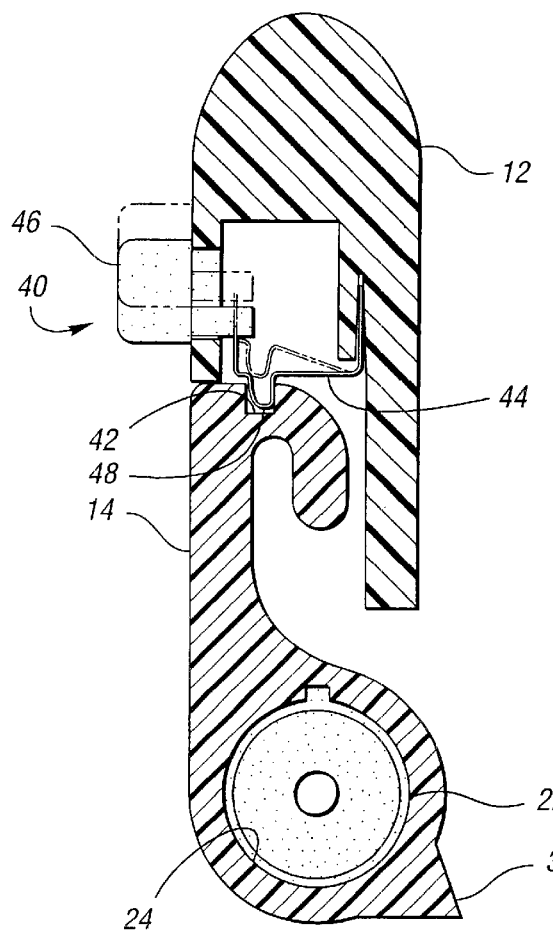
FIG. 6 is a cross-sectional view of the handle assembly.

A latch mechanism 40 is engageable with a third slot 42 in the coat-hook 14 to secure the coat-hook 14 in the stowed position shown in FIG. 6. The latch mechanism 40 includes a latch spring 44, which is preferably a stamped metal spring, and a latch button 46 slidably engaged with the handle 12. The latch spring 44 has one end connected to the handle 12, and an opposite end connected to the latch button 46. The latch spring 44 further has a detent 48 that is engageable with the third slot 42 of the coat-hook 14. The latch mechanism 40 is movable between a latched position, shown in solid lines in FIG. 6, and an unlatched position shown in phantom.

To assemble the handle assembly 10, the latch spring 44 and latch button 46 are connected to the handle 12. Next, the damper 22 is inserted into the bore 24 of the coat-hook 14, and the second torsional spring 38 is mounted on the coat-hook 14. The handle 12 is then aligned with the hinges 18, and the coat-hook 14 is inserted into the handle 12. Next, the first torsional spring 21 is positioned between the handle 12 and the mounting bracket 16, and the pivot pins 19 and 20 are inserted through corresponding holes in the handle 12 and the hinges 18.

When the handle assembly 10 is not in use, the handle 12 is held in the rest position by the first torsional spring 21, and the coat-hook 14 is secured in the stowed position, shown in FIGS. 1 and 6, by the latch mechanism 40. When the latch button 46 is moved upwardly, the latch spring 44 is released from the coat-hook 14, and the coat-hook 14 is urged to the use position by the second torsional spring 38. As previously mentioned, the movement of the coat-hook 14 is dampened by the damper 22 and is limited by the projection 39. Advantageously, the handle 12 does not support any loads carried by the coat-hook 14 when the coat-hook 14 is in the use position. The coat-hook 14 may then be returned to the stowed position by forcing the coat-hook 14 against the bias of the second torsional spring 38 until the latch mechanism 40 snaps into the latched position shown in FIG. 6.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the latch mechanism may be provided with a latch button that is moveable inwardly with respect to the handle, instead of a latch button that slides along an exterior surface of the the handle.

What is claimed is:

1. A handle assembly for use with a motor vehicle, the handle assembly comprising:
   a handle adapted to be connected to the vehicle;
   a support hook pivotally connected to the handle, wherein the support hook is pivotable between a stowed position and a use position for supporting articles in the vehicle, the support hook having a slot; and
   a latch mechanism that is moveably associated with the handle and engageable with the slot to secure the support hook in the stowed position, the latch mechanism being moveable between a latched position in which the latch mechanism is engaged with the slot, and an unlatched position in which the latch mechanism is disengaged from the slot, the latch mechanism further including a latch button for moving the latch mechanism to the unlatched position.

2. The handle assembly of claim 1 further comprising a spring connected between the handle and the support hook for urging the support hook toward the use position.

3. The handle assembly of claim 1 wherein the handle includes a leg having first and second leg portions, and the support hook is disposed between the leg portions.

4. The handle assembly of claim 1 further comprising a mounting bracket adapted to be connected to the vehicle, wherein the handle and the support hook are connected to the mounting bracket such that the support hook may pivot with respect to the handle and the mounting bracket.

5. The handle assembly of claim 4 further comprising a dampening mechanism connected between the mounting bracket and the support hook for dampening pivotal movement of the support hook.

6. The handle assembly of claim 5 wherein the dampening mechanism includes an inner cylinder connected to the mounting bracket, and an outer cylinder that frictionally and rotatably engages the inner cylinder, the outer cylinder being connected to the support hook.

7. The handle assembly of claim 6 wherein one of the cylinders comprises silicone.

8. The handle assembly of claim 6 wherein the inner cylinder has a first rib that engages a first slot of the mounting bracket, and the outer cylinder has a second rib that engages a second slot of the support hook.

9. The handle assembly of claim 4 wherein the handle is pivotally connected to the mounting bracket, and the support hook pivots with the handle when the support hook is in the stowed position.

10. The handle assembly of claim 9 further comprising a spring connected between the handle and the mounting bracket for urging the handle upwardly toward a rest position.

11. The handle assembly of claim 9 further comprising a dampening mechanism connected between the mounting bracket and the support hook for controlling pivotal movement of the support hook, wherein the dampening mechanism also dampens pivotal movement of the handle when the support hook is in the stowed position.

12. The handle assembly of claim 11 wherein the dampening mechanism includes an inner cylinder connected to the mounting bracket, and an outer cylinder that frictionally and rotatably engages the inner cylinder, the outer cylinder being connected to the support hook.

13. The handle assembly of claim 12 wherein one of the cylinders comprises silicone.

14. The handle assembly of claim 12 wherein the inner cylinder has a first rib that engages a first slot of the mounting bracket, and the outer cylinder has a second rib that engages a second slot of the support hook.

15. The handle assembly of claim 4 wherein the support hook further includes a projection that is engageable with the mounting bracket so as to limit movement of the support hook.

16. The handle assembly of claim 1 wherein the support hook is a coat-hook.

17. A handle assembly for use with a motor vehicle, the handle assembly comprising:
   a mounting bracket adapted to be mounted to the vehicle;
   a handle pivotally connected to the mounting bracket;
   a first spring connected between the handle and the mounting bracket for urging the handle upwardly;

a support hook pivotally connected to the handle and the mounting bracket, wherein the support hook is pivotable with respect to the handle between a stowed position and a use position for supporting articles in the vehicle;

a second spring connected between the support hook and the handle for urging the support hook toward the use position;

a dampening mechanism connected between the mounting bracket and the support hook for dampening pivotal movement of the support hook, wherein the dampening mechanism also dampens pivotal movement of the handle when the support hook is in the stowed position; and a latch mechanism that is moveably associated with the handle, and engageable with a slot in the support hook to secure the support hook in the stowed position.

18. A handle assembly for use with a motor vehicle, the handle assembly comprising:

a mounting bracket adapted to be connected to the vehicle;

a handle pivotally connected to the mounting bracket;

a support hook pivotally connected to the handle and the mounting bracket, wherein the support hook is pivotable with respect to the handle between a stowed position and a use position for supporting articles in the vehicle, and the support hook is pivotable with the handle when the support hook is in the stowed position;

a spring connected between the handle and the mounting bracket for urging the handle upwardly toward a rest position; and a latch mechanism that is moveably associated with the handle and engageable with a slot in the support hook to secure the support hook in the stowed position.

19. A handle assembly for use with a motor vehicle, the handle assembly comprising:

a mounting bracket adapted to be connected to the vehicle;

a handle connected to the mounting bracket;

a support hook pivotally connected to the handle and the mounting bracket, wherein the support hook is pivotable with respect to the handle between a stowed position and a use position for supporting articles in the vehicle; and a dampening mechanism connected between the mounting bracket and the support hook for dampening pivotal movement of the support hook, the dampening mechanism including an inner cylinder connected to the mounting bracket, and an outer cylinder connected to the support hook that frictionally and rotatably engages the inner cylinder.

20. The handle assembly of claim 19 further comprising a spring connected between the handle and the support hook for urging the support hook toward the use position.

21. The handle assembly of claim 19 further comprising a latch mechanism that is moveably associated with the handle and engageable with a slot in the support hook to secure the support hook in the stowed position.

22. The handle assembly of claim 19 wherein one of the cylinders comprises silicone.

23. The handle assembly of claim 19 wherein the inner cylinder has a first rib that engages a first slot of the mounting bracket, and the outer cylinder has a second rib that engages a second slot of the support hook.

24. The handle assembly of claim 19 wherein the handle is pivotally connected to the mounting bracket, and the support hook is pivotable with the handle when the support hook is in the stowed position.

25. The handle assembly of claim 24 further comprising a spring connected between the handle and the mounting bracket for urging the handle upwardly toward a rest position.

26. The handle assembly of claim 24 wherein the dampening mechanism also dampens pivotal movement of the handle when the support hook is in the stowed position.

27. The handle assembly of claim 19 wherein the support hook is a coat-hook.

28. The handle assembly of claim 19 wherein the handle includes a leg having first and second leg portions, and the support hook is a coat-hook that is disposed between the leg portions.

29. The handle assembly of claim 19 wherein the support hook further includes a projection that is engageable with the mounting bracket so as to limit movement of the support hook.

30. A handle assembly for use with a motor vehicle, the handle assembly comprising:

a mounting bracket adapted to be connected to the vehicle;

a handle pivotally connected to the mounting bracket;

a support hook pivotally connected to the handle and the mounting bracket, wherein the support hook is pivotable with respect to the handle between a stowed position and a use position for supporting articles in the vehicle, and the support hook is pivotable with the handle when the support hook is in the stowed position;

a first spring connected between the handle and the mounting bracket for urging the handle upwardly toward a rest position; and a second spring connected between the handle and the support hook for urging the support hook toward the use position.

31. The handle assembly of claim 30 wherein the support hook further includes a projection that is engageable with the mounting bracket so as to limit movement of the support hook.

32. The handle assembly of claim 30 further comprising a latch mechanism that is moveably associated with the handle and engageable with a slot in the support hook to secure the support hook in the stowed position.

33. The handle assembly of claim 30 further comprising a dampening mechanism connected between the mounting bracket and the support hook for dampening pivotal movement of the support hook.

34. The handle assembly of claim 33 wherein the dampening mechanism includes an inner cylinder connected to the mounting bracket, and an outer cylinder that frictionally and rotatably engages the inner cylinder, the outer cylinder being connected to the support hook.

35. The handle assembly of claim 30 wherein the support hook is a coat-hook.

36. The handle assembly of claim 30 wherein the handle includes a leg having first and second leg portions, and the support hook is disposed between the leg portions.

37. A handle assembly for use with a motor vehicle, the handle assembly comprising:

a mounting bracket adapted to be connected to the vehicle;

a handle pivotally connected to the mounting bracket and including a leg having first and second leg portions;

a support hook pivotally connected to the handle and the mounting bracket such that the support hook is disposed between the leg portions, wherein the support hook is pivotable with respect to the handle between a stowed position and a use position for supporting articles in the vehicle, and the support hook is pivotable with the handle when the support hook is in the stowed position; and a spring connected between the handle and the mounting bracket for urging the handle upwardly toward a rest position.

38. A handle assembly for use with a motor vehicle, the handle assembly comprising:

a mounting bracket adapted to be connected to the vehicle;

a handle pivotally connected to the mounting bracket;

a support hook pivotally connected to the handle and the mounting bracket, wherein the support hook is pivotable with respect to the handle between a stowed position and a use position for supporting articles in the vehicle, and the support hook is pivotable with the handle when the support hook is in the stowed position; and a dampening mechanism connected between the mounting bracket and the support hook for dampening pivotal movement of the support hook, wherein the dampening mechanism also dampens pivotal movement of the handle when the support hook is in the stowed position.

39. The handle assembly of claim 38 further comprising a spring connected between the handle and the support hook for urging the support hook toward the use position.

40. The handle assembly of claim 38 further comprising a latch mechanism that is moveably associated with the handle and engageable with a slot in the support hook to secure the support hook in the stowed position.

41. The handle assembly of claim 38 wherein the support hook is a coat-hook.

42. The handle assembly of claim 38 wherein the handle includes a leg having first and second leg portions, and the support hook is disposed between the leg portions.

43. The handle assembly of claim 38 wherein the support hook further includes a projection that is engageable with the mounting bracket so as to limit movement of the support hook.

44. A handle assembly for use with a motor vehicle, the handle assembly comprising:

a mounting bracket adapted to be connected to the vehicle;

a handle pivotally connected to the mounting bracket, the handle including a leg having first and second leg portions; and a support hook pivotally connected to the handle and disposed between the leg portions, wherein the support hook is pivotable between a stowed position and a use position for supporting articles in the vehicle.

45. The handle assembly of claim 44 wherein the support hook is a coat-hook.

46. The handle assembly of claim 44 further comprising a spring connected between the handle and the support hook for urging the support hook toward the use position.

47. The handle assembly of claim 44 further comprising a latch mechanism that is moveably associated with the handle and engageable with a slot in the support hook to secure the support hook in the stowed position.

48. The handle assembly of claim 44 wherein the handle and the support hook are connected to the mounting bracket such that the support hook may pivot with respect to the handle and the mounting bracket.

49. The handle assembly of claim 48 wherein the support hook further includes a projection that is engageable with the mounting bracket so as to limit movement of the support hook.

50. The handle assembly of claim 48 wherein the support hook is pivotable with the handle when the support hook is in the stowed position, and the support hook is not pivotable with the handle when the support hook is in the use position.

* * * * *